US009646787B2

(12) United States Patent
Hatanaka et al.

(10) Patent No.: US 9,646,787 B2
(45) Date of Patent: May 9, 2017

(54) INPUT DEVICE (71) Applicant: DENSO CORPORATION, Kariya, Aichi-pref. (JP)

(72) Inventors: Shinji Hatanaka, Nishio (JP); Shinsuke Hisatsugu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/106,923

(22) PCT Filed: Dec. 3, 2014

(86) PCT No.: PCT/JP2014/006049
§ 371 (c)(1),
(2) Date: Jun. 21, 2016

(87) PCT Pub. No.: WO2015/097997
PCT Pub. Date: Jul. 2, 2015

(65) Prior Publication Data
US 2017/0032915 A1    Feb. 2, 2017

(30) Foreign Application Priority Data
Dec. 26, 2013  (JP) ................. 2013-268746

(51) Int. Cl.
*H01H 36/02* (2006.01)
*G06F 3/01* (2006.01)

(52) U.S. Cl.
CPC ............. *H01H 36/02* (2013.01); *G06F 3/014* (2013.01); *G06F 3/016* (2013.01)

(58) Field of Classification Search
CPC ............... H01H 36/02; H01H 2215/05; H01H 2239/01; G06F 3/016; G06F 3/0338; G06F 3/0354
See application file for complete search history.

(56) References Cited

U.S. PATENT DOCUMENTS 6,747,631 B1     6/2004  Sakamaki et al.
6,839,050 B2 *   1/2005  Sakamaki .............. B60K 37/06
                                                    345/156

(Continued)

FOREIGN PATENT DOCUMENTS

JP        3543695 B2    7/2004
JP        4142430 B2    9/2008

(Continued)

*Primary Examiner* — Bernard Rojas
(74) *Attorney, Agent, or Firm* — Harness, Dickey & Pierce, P.L.C.

(57) ABSTRACT

An input device includes a movable input unit for input of an operating force along an operation plane, a supporting unit movably supporting the input unit, a first actuator, a second actuator and a magnetic path forming body. In the first actuator, a first magnetic pole forming unit forms a magnetic pole and generates a first magnetic flux passing through a first coil. In the second actuator, a second magnetic pole forming unit forms a magnetic pole and generates a second magnetic flux passing through a second coil. The magnetic path forming body forms a magnetic circuit that guides the first magnetic flux generated by the first magnetic pole forming unit to make the first magnetic flux pass through the second coil and also guides the second magnetic flux generated by the second magnetic pole forming unit to make the second magnetic flux pass through the first coil.

8 Claims, 9 Drawing Sheets

(56) References Cited

U.S. PATENT DOCUMENTS

| | | | | |
|---|---|---|---|---|
| 7,336,006 | B2* | 2/2008 | Watanabe | G06F 3/016 |
| | | | | 310/12.25 |
| 7,436,396 | B2* | 10/2008 | Akieda | G06F 3/016 |
| | | | | 345/156 |
| 8,988,351 | B2* | 3/2015 | Okada | G06F 3/0338 |
| | | | | 345/156 |
| 9,298,259 | B2* | 3/2016 | Wiertlewski | G06F 3/015 |
| 2004/0125082 | A1 | 7/2004 | Akieda et al. | |

FOREIGN PATENT DOCUMENTS

| | | |
|---|---|---|
| JP | 2011232946 A | 11/2011 |
| WO | WO-2014174793 A1 | 10/2014 |
| WO | WO-2015064038 A1 | 5/2015 |

* cited by examiner

INPUT DEVICE

CROSS REFERENCE TO RELATED APPLICATIONS

This application is a U.S. National Phase Application under 35 U.S.C. 371 of International Application No. PCT/JP2014/006049 filed on Dec. 3, 2014 and published in Japanese as WO 2015/097997 A1 on Jul. 2, 2015. This application is based on and claims the benefit of priority from Japanese Patent Application No. 2013-268746 filed on Dec. 26, 2013. The entire disclosures of all of the above applications are incorporated herein by reference.

TECHNICAL FIELD

The present disclosure relates to an input device to which an operating force is inputted.

Patent Literature 1 discloses an input device including an operation knob to which an operating force is inputted and a main body supporting the operation knob such that the operation knob is movable by inputting an operating force. The input device further includes two voice coil motors. The two voice coil motors each include a magnet to form magnetic poles and a voice coil to be passed through by a magnetic flux generated by the magnet and each function as an actuator. The electromagnetic forces generated when electric currents are applied to the two voice coil motors act on the operation knob as operation reaction forces in mutually opposing directions. In this configuration, controlling the current applied to each voice coil makes it possible to cause the user to feel, via the operation knob, an operation reaction force of a desired magnitude.

According to Patent Literature 1, each voice coil motor is provided with a yoke to form a magnetic circuit. Therefore, the magnetic flux generated by the magnet of one voice coil motor passes through only the voice coil included in the one voice coil motor and does not pass through the voice coil included in the other voice coil motor. In such a configuration, to increase the density of the magnetic flux to pass through each voice coil, it is unavoidable to intensify the magnet of each voice coil motor. This inevitably increases the required amount of the magnet material.

PRIOR ART LITERATURES

Patent Literature

Patent Literature 1: JP 2011-232946A

SUMMARY OF INVENTION

An object of the present disclosure is to provide an input device in which magnitude of an operation reaction force to act on an input unit such as an operation knob or the like can be increased while keeping small the amount of material required to form a magnetic pole forming unit such as a magnet.

In an aspect of the present disclosure, an input device includes an input unit, a supporting unit, a first actuator, a second actuator, and a magnetic path forming body. The input unit is for input of an operating force in a direction along an operation plane. The supporting unit movably supports the input unit such that the input unit is movable along the operation plane in response to the input of the operating force. The first actuator includes a first magnetic pole forming unit and a first coil. The first magnetic pole forming unit forms a magnetic pole and generates a magnetic flux passing through the first coil such that an electromagnetic force generated by applying current to the first coil acts on the input unit as an operation reaction force in a first direction along the operation plane. The second actuator includes a second magnetic pole forming unit and a second coil. The second magnetic pole forming unit forms a magnetic pole and generates a magnetic flux passing through the second coil such that an electromagnetic force generated by applying current to the second coil acts on the input unit as an operation reaction force in a second direction along the operation plane and the second direction is nonparallel to the first direction. The magnetic path forming body forms a magnetic circuit. The magnetic circuit guides the magnetic flux generated by the first magnetic pole forming unit so that the magnetic flux generated by the first magnetic pole forming unit passes through the second coil and also guides the magnetic flux generated by the second magnetic pole forming unit so that the magnetic flux generated by the second magnetic pole forming unit passes through the first coil.

According to the above input device, the magnetic flux generated by the first magnetic pole forming unit of the first actuator passes through not only the first coil of the first actuator but also the second coil of the second actuator by being led through the magnetic circuit formed by the magnetic path forming body. Similarly, the magnetic flux generated by the second magnetic pole forming unit of the second actuator passes through not only the second coil of the second actuator but also the first coil of the first actuator by being led through the magnetic circuit.

Thus, in the above configuration, the magnetic flux generated by the magnetic pole forming unit of one of the actuators is led through the magnetic circuit to the coil of the other actuator. In this way, the magnetic fluxes passing through the coils of the two actuators can be both increased. Therefore, the electromagnetic forces that can be generated in the two actuators both increase. This makes it possible to increase, while keeping the amount of material required to form the magnetic pole forming units small, the operation reaction forces applicable to the input unit.

BRIEF DESCRIPTION OF DRAWINGS

The above and other objects, configurations and advantages of the present disclosure will become more apparent from the following detailed description made with reference to the following drawings. In the drawings.

EMBODIMENTS FOR CARRYING OUT INVENTION

Embodiments of the present disclosure will be described in the following with reference to drawings. In the following, components corresponding between embodiments may be denoted by identical reference numerals, and duplicate description of such components may be omitted. In cases where only a part of the configuration of an embodiment is described, the remaining part of the configuration of the embodiment may have a corresponding part of an earlier-described embodiment applied thereto. Also, besides combinations of configurations explicitly disclosed concerning individual embodiments, partial combinations of a plurality of embodiment configurations not explicitly disclosed are also allowed provided that such combinations do not cause any combinational problem. Furthermore, combinations, not explicitly disclosed, of configurations described concerning embodiments and modifications are also regarded as disclosed by the following description.

First Embodiment

Figure 1:
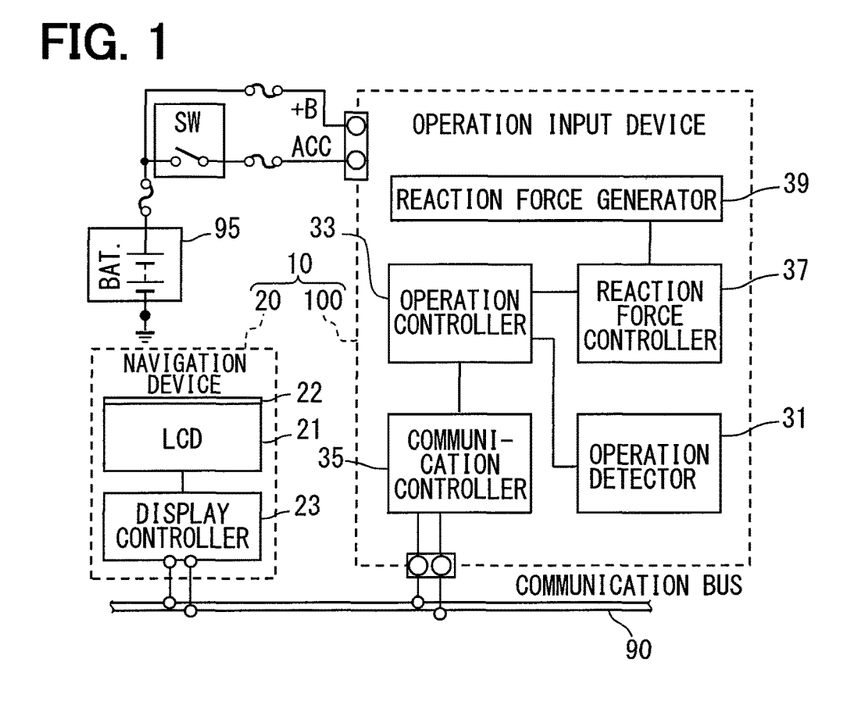
FIG. 1 is a diagram illustrating a display system including an operation input device according to a first embodiment of the present disclosure.
Figure 2:
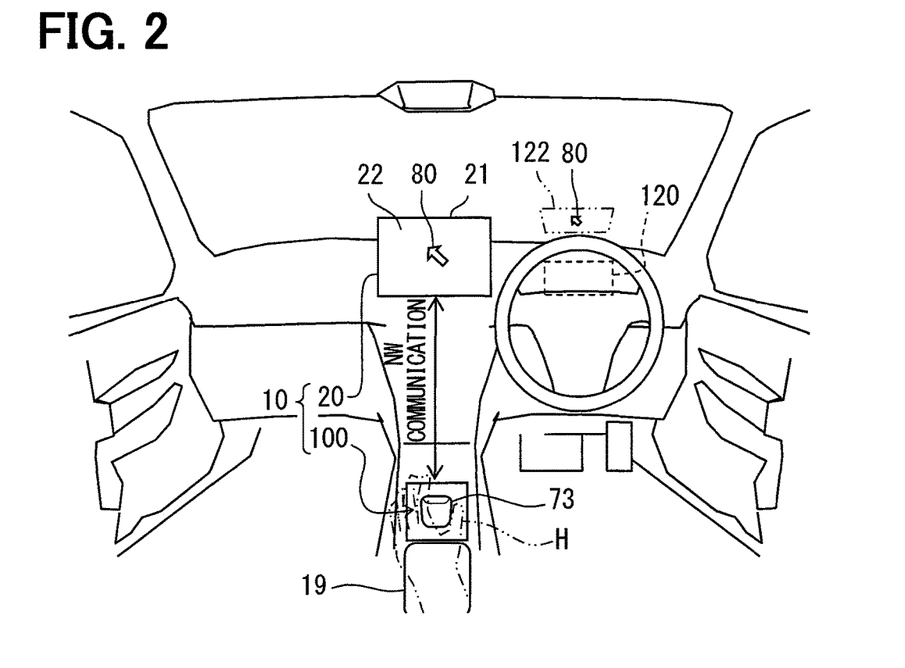
FIG. 2 is a diagram illustrating an arrangement of the operation input device in a vehicle interior.

Referring to FIG. 1, an operation input device 100 according to a first embodiment of the present disclosure is mounted in a vehicle and constitutes, in a vehicle interior, a display system 10 along with other devices including, for example, a navigation device 20 or a head-up display device 120 (see FIG. 2). The operation input device 100 is, as shown in FIG. 2, installed in a center console of the vehicle adjacently to a palm rest 19 and includes an operation knob 73 exposed in an area within reach of the operator's hand. When an operating force is applied to the knob 73 by the operator's hand H, the knob 73 is displaced in the direction in which the operating force is applied.

The navigation device 20 is installed in an instrument panel of the vehicle and includes a display screen 22 exposed to face toward the driver seat. The display screen 22 displays a plurality of icons associated with predetermined functions and a pointer 80 used to select an optional icon. When a horizontal operating force is applied to the operation knob 73, the pointer 80 moves in the direction of the operating force on the display screen 22. The navigation device 20 is, as shown in FIGS. 1 and 2, coupled to a communication bus 90 and can communicate, for example, with the operation input device 100 via a network. The navigation device 20 includes a display controller 23 to draw images for display on the display screen 22 and a liquid crystal display 21 to consecutively display images drawn by the display controller 23 on the display screen 22.

Components of the operation input device 100 will be described in detail below. The operation input device 100 is, as shown in FIG. 1, coupled to the communication bus 90 and an external battery 95. The operation input device 100 can communicate, via the communication bus 90, with the navigation device 20 installed separately from the operation input device 100. From the battery 95T, the operation input device 100 is supplied with power necessary to operate the components thereof.

The operation input device 100 is electrically configured with components such as a communication controller 35, an operation detector 31, a reaction force generator 39, a reaction force controller 37, an operation controller 33 etc.

The communication controller 35 outputs information processed by the operation controller 33 to the communication bus 90. Also, the communication controller 35 collects information outputted from other in-vehicle devices to the communication bus 90 and outputs the collected information to the operation controller 33. The operation detector 31 detects the position of the operation knob 73 (see FIG. 2) moved by an operating force applied to the operation knob 73. The operation detector 31 outputs operation information representing the detected position of the operation knob 73 to the operation controller 33.

The reaction force generator 39 is configured to make the operation knob 73 generate an operation reaction force and includes an actuator, for example, a voice coil motor. The reaction force generator 39 applies, for example, when the pointer 80 (see FIG. 2) overlaps an icon on the display screen 22, an operation reaction force to the operation knob 73 (see FIG. 2) so as to cause, by means of a so-called reaction force feedback, the operator to have a pseudo-feeling of icon. The reaction force controller 37 includes, for example, a microcomputer to perform various calculations. The reaction force controller 37 controls, based on reaction force information obtained from the operation controller 33, the direction and magnitude of the operation reaction force to be applied from the reaction force generator 39 to the operation knob 73.

The operation controller 33 includes, for example, a microcomputer to perform various calculations. The operation controller 33 obtains operation information detected by the operation detector 31 and outputs the obtained information to the communication bus 90 via the communication controller 35. The operation controller 33 also calculates the direction and magnitude of the operation reaction force to be applied to the operation knob 73 (see FIG. 2) and outputs the calculation results to the reaction force controller 37 as reaction force information.

Figure 3:
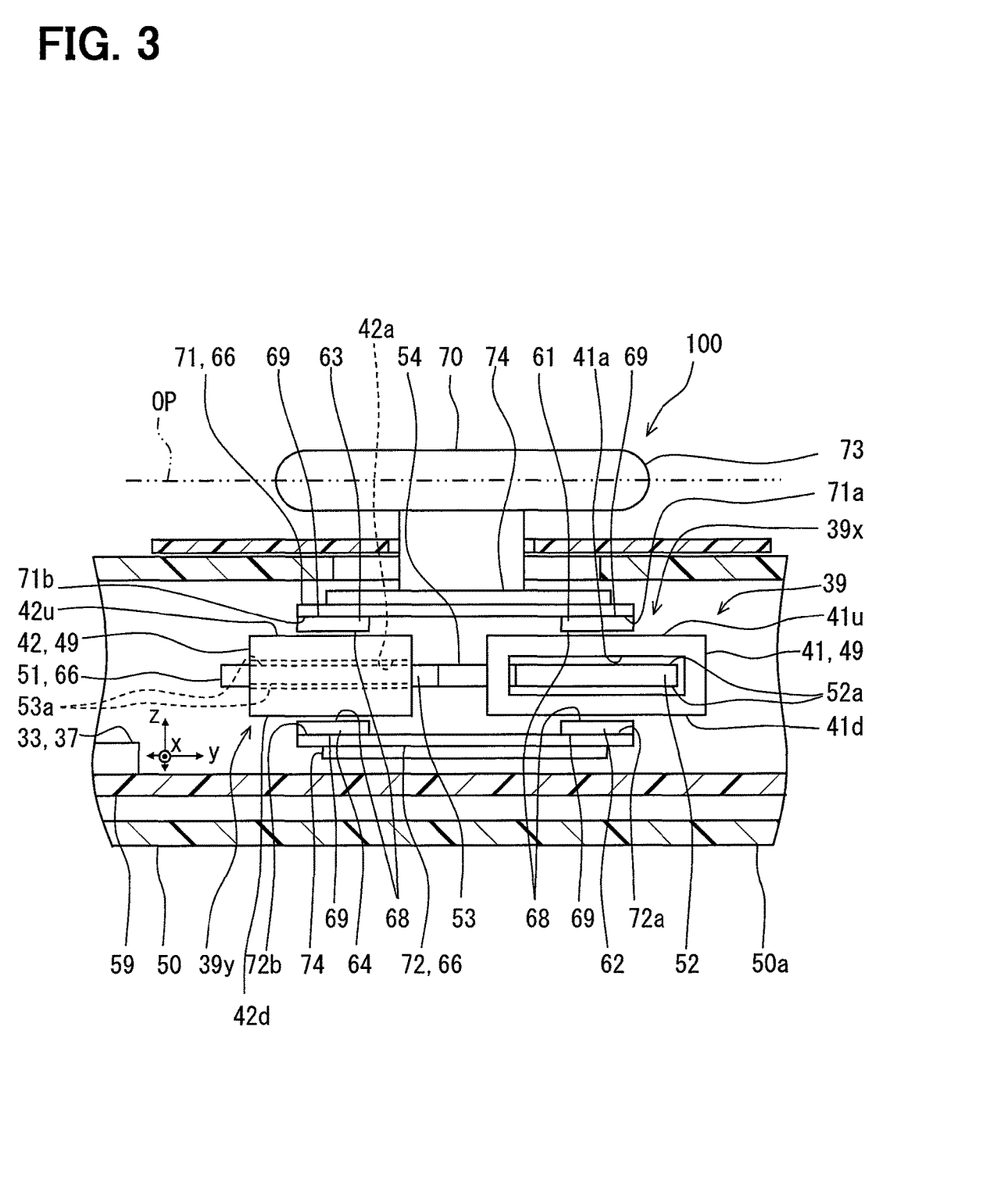
FIG. 3 is a sectional drawing illustrating a mechanical configuration of the operation input device.

The operation input device 100 has a mechanical configuration including, as shown in FIG. 3, a movable portion 70 and a fixed portion 50.

The movable portion 70 includes a knob base 74 and the operation knob 73. The knob base 74 holds a pair of movable yokes 71 and 72 being described later. The movable portion 70 is movable relative to the fixed portion 50 in the x-axis and y-axis directions along an imaginary operation plane OP. The movable range of the movable portion 70 in each of the x-axis and y-axis directions is pre-defined by the fixed portion 50. When the movable portion 70 is released from the operating force applied thereto, the movable portion 70 returns to a reference position therefor.

The fixed portion 50 includes a housing 50a and a circuit board 59 and holds a fixed yoke 51 being described later. The housing 50a accommodates components such as the circuit board 59 and the reaction force generator 39 while relatively movably supporting the movable portion 70. The circuit board 59 is fixed in the housing 50a such that the surface of the circuit board 59 extends along the operation plane OP. The circuit board 59 is mounted with, for example, a microcomputer constituting the operation controller 33 and the reaction force controller 37.

Figure 4:
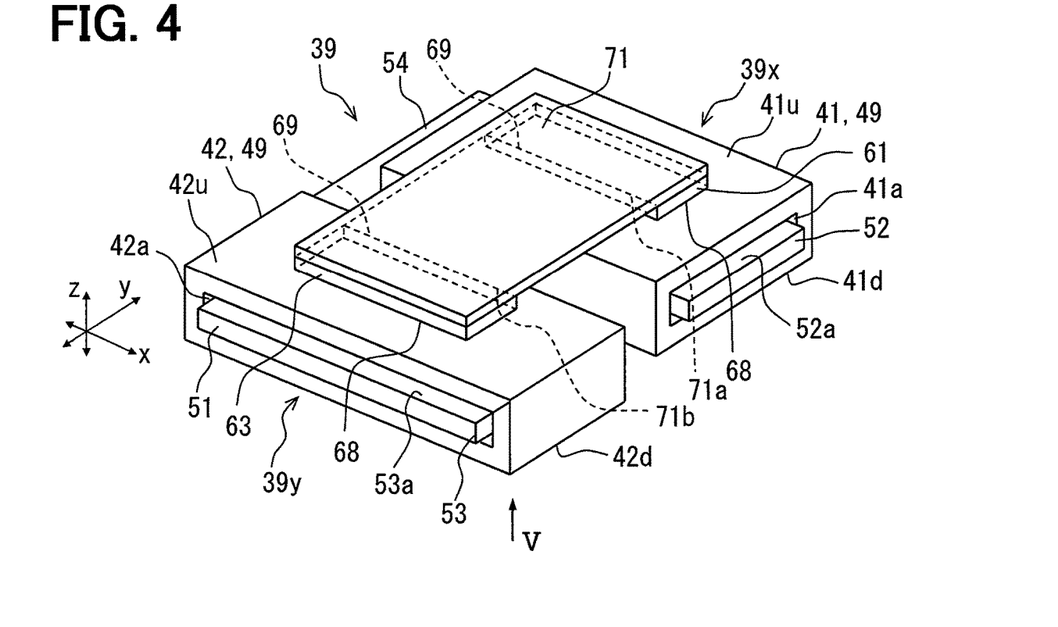
FIG. 4 is a perspective view of a reaction force generator.
Figure 5:
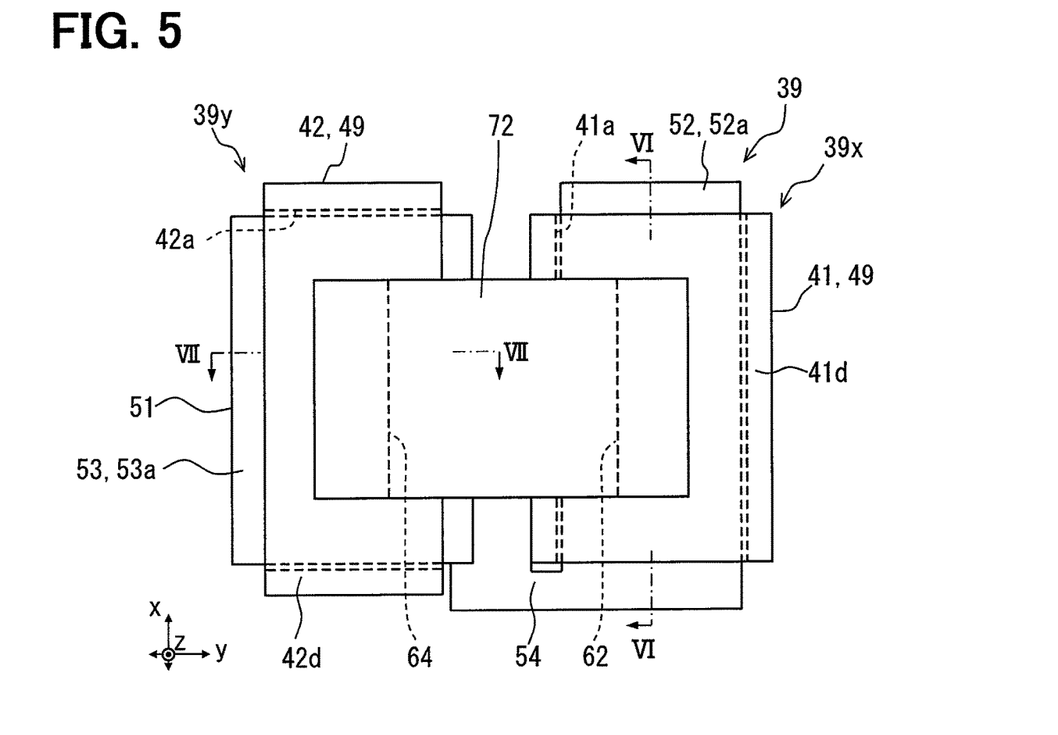
FIG. 5 is a bottom view of the reaction force generator as seen in the direction of arrow V in FIG. 4.

The reaction force generator 39 shown in FIGS. 3 to 5 carries out a reaction force feedback between the movable portion 70 and the fixed portion 50. The reaction force generator 39 includes a first voice coil motor (VCM) 39x and a second VCM 39y, a fixed yoke 51, and two movable yokes 71 and 72. Each VCM functions as an actuator. The first VCM 39x has a first coil 41 and two magnets 61 and 62. The second VCM 39y has a second coil 42 and two magnets 63 and 64. In the following, the coils 41 and 42, magnets 61 to 64, fixed yoke 51, and movable yokes 71 and 72 will be described in order in detail.

The coils 41 and 42 are each formed by winding a non-magnetic wire, for example, a copper wire into a winding 49 of a flat cylindrical shape. In each of the coils 41 and 42, the cross-section perpendicular to the winding axis direction of the winding 49 is rectangular. The winding 49 of each of the coils 41 and 42 is formed by winding a wire until the cylindrical wall of the coil is, for example, about 3 mm thick. In the coils 41 and 42, accommodation space 41a and 42a surrounded by the inner peripheries of the respective windings 49 are formed to extend in the winding axis directions of the respective windings 49. The coils 41 and 42 are electrically coupled to the reaction force controller 37 via wiring patterns formed over the circuit board 59. The windings 49 of the coils 41 and 42 are respectively applied with electric currents by the reaction force controller 37.

The coils 41 and 42 are disposed slightly apart from each other along the y axis. The coils 41 and 42 are fixed to the fixed portion 50, for example, to the circuit board 59 such that the winding axis of each winding 49 extends along the operation plane OP. In a coil (hereinafter referred to as the "first coil") 41, the winding axis extends along the x axis. In the other coil (hereinafter referred to as the "second coil") 42, the winding axis extends along the y axis. The coils 41 and 42 have a pair of coil surfaces 41u and 41d and a pair of coil surfaces 42u and 42d, respectively, all extending along the operation plane OP. The coil surfaces 41u and 42u of the coils 41 and 42 are the upperside coil surfaces of the respective coils and face the operation knob 73. The coil surfaces 41d and 42d of the coils 41 and 42 are the underside coil surfaces of the respective coils and face the circuit board 59. The coil surfaces 41u, 41d, 42u, and 42d of the coils 41 and 42 are approximately rectangular having sides extending along the x or y axis.

The magnets 61 to 64 are, for example, neodymium magnets each shaped into an approximately rectangular plate having a longitudinal direction. The two magnets 61 and 62 are disposed apart from each other in the z-axis direction substantially perpendicular to the operation plane OP and are arranged along the z-axis direction. Similarly, the other two magnets 63 and 64 are disposed apart from each other in the z-axis direction and are arranged along the z-axis direction. The magnets 61 to 64 each have a magnetized surface 68 and a mounting surface 69 both of which are smooth and flat. The magnetized surface 68 and the mounting surface 69 of each of the magnets 61 to 64 have mutually different magnetic poles (see FIGS. 6 and 7 also).

The mounting surfaces 69 of the two magnets 61 and 63 are attached to the movable yoke 71 such that their longer sides extend along the y axis. The magnetized surface 68 of the magnet 61 attached to the movable yoke 71 faces the upperside coil surface 41u of the first coil 41 across a predetermined distance in the z-axis direction. The magnetized surface 68 of the magnet 63 attached to the movable yoke 71 faces the upperside coil surface 42u of the second coil 42 across a predetermined distance in the z-axis direction.

The mounting surfaces 69 of the other two magnets 62 and 64 are attached to the movable yoke 72 such that their longer sides extend along the y axis. The magnetized surface 68 of the magnet 62 attached to the movable yoke 72 faces the underside coil surface 41d of the first coil 41 across a predetermined distance in the z-axis direction. The magnetized surface 68 of the magnet 64 attached to the movable yoke 72 faces the underside coil surface 42d of the second coil 42 across a predetermined distance in the z-axis direction. When the movable portion 70 is in its reference position, the magnetized surface 68 of each magnet is positioned to face a center portion of the corresponding one of the coil surfaces 41u, 41d, 42u, and 42d.

Figure 6:
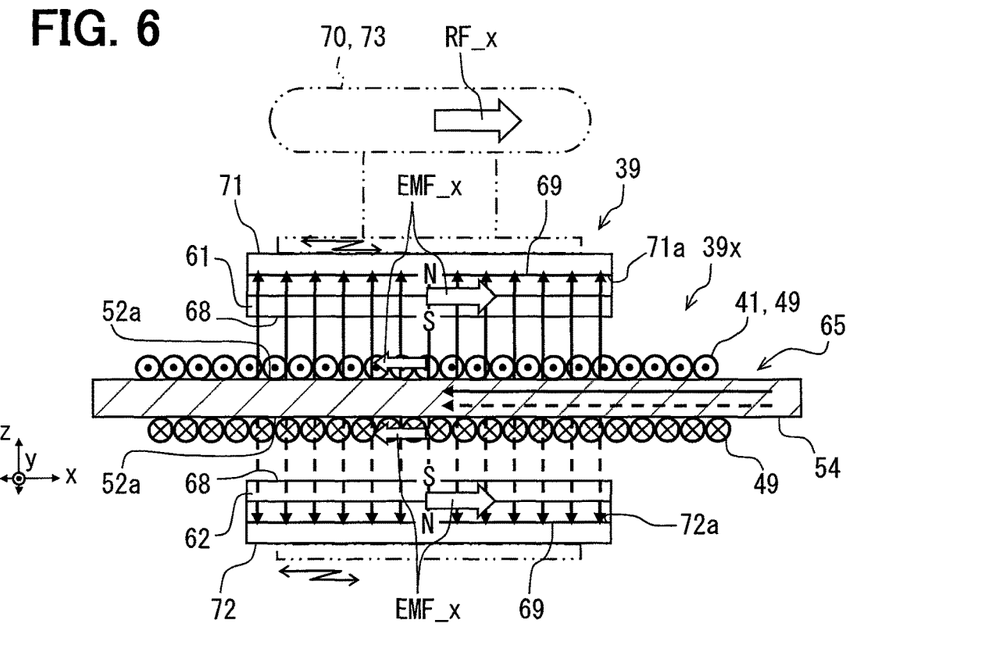
FIG. 6 is a view taken along line VI-VI in FIG. 5 schematically showing magnetic flux flows through a magnetic circuit.

In the above configuration, as shown in FIG. 6, the magnetic flux generated by each of the magnets 61 and 62 passes (penetrates) through the winding 49 of the first coil 41 in the z-axis direction. Therefore, when an electric current is applied to the first coil 41 causing electric charges to move in the winding 49 placed in a magnetic field, each electric charge generates a Lorentz force. In this way, the first VCM 39x causes electromagnetic force EMF_x in the x-axis direction to be generated between the first coil 41 and the magnets 61 and 62. When the direction of the electric current applied to the first coil 41 is reversed, the direction of the electromagnetic force EMF_x generated is also reversed in the x-axis direction.

Figure 7:
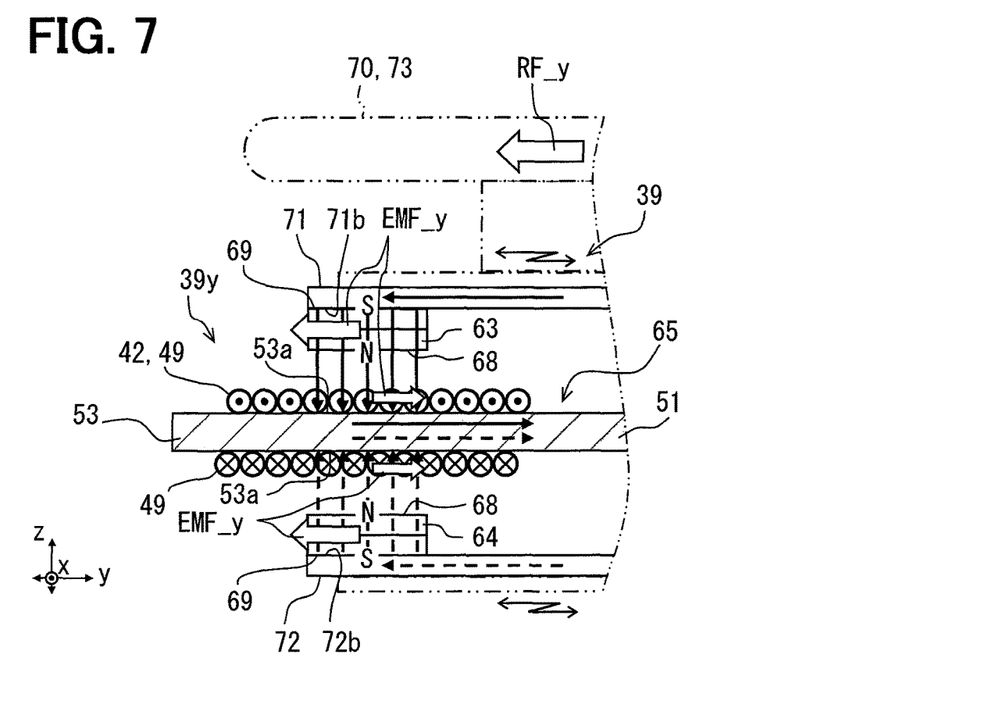
FIG. 7 is a view taken along line VII-VII in FIG. 5 schematically showing magnetic flux flows through the magnetic circuit.

As shown in FIG. 7, the magnetic flux generated by each of the magnets 63 and 64 passes (penetrates) through the winding 49 of the second coil 42 in the z-axis direction. Therefore, when an electric current is applied to the second coil 42 causing electric charges to move in the winding 49 placed in a magnetic field, each electric charge generates a Lorentz force. In this way, the second VCM 39y causes electromagnetic force EMF_x in the y-axis direction to be generated between the second coil 42 and the magnets 63 and 64. When the direction of the electric current applied to the second coil 42 is reversed, the direction of the electromagnetic force EMF_y generated is also reversed in the y-axis direction.

The fixed yoke 51 shown in FIGS. 3 to 5 is formed of a magnetic material, for example, soft iron or a magnetic steel sheet. The fixed yoke 51 includes two coil-side yoke portions 52 and 53 and a coupling portion 54. The coil-side yoke portions 52 and 53 are each formed into a flat plate shape.

A coil-side yoke portion (hereinafter referred to as the "first coil-side yoke portion") 52 is inserted in and through the accommodation space 41a of the first coil 41. Opposite surfaces of the first coil-side yoke portion 52 accommodated in the accommodation space 41a have first opposing surfaces 52a. The two first opposing surfaces 52a are positioned on the inner periphery side of the first coil 41 such that the first coil 41 is sandwiched between the two first opposing surfaces 52a on the inner periphery side of the first coil 41 and the two magnets 61 and 62 positioned on the outer periphery side of the first coil 41 and such that the two first opposing surfaces 52a face the magnetized surfaces 68 of the magnets 61 and 62, respectively.

The other coil-side yoke portion (hereinafter referred to as the "second coil-side yoke portion") 53 is inserted in and through the accommodation space 42a of the second coil 42. Opposite surfaces of the second coil-side yoke portion 53 accommodated in the accommodation space 42a have second opposing surfaces 53a. The two second opposing surfaces 53a are positioned on the inner periphery side of the second coil 42 such that the second coil 42 is sandwiched between the two second opposing surfaces 53a on the inner periphery side of the second coil 42 and the two magnets 63 and 64 positioned on the outer periphery side of the second coil 42 and such that the two second opposing surfaces 53a face the magnetized surfaces 68 of the magnets 63 and 64, respectively. The magnetic flux generated by each of the magnets 63 and 64 and induced into the second coil-side yoke portion 53 passes (penetrates) through the winding 49 of the second coil 42 in the z-axis direction.

The coupling portion 54 is bent in an L-shape along the coils 41 and 42. The coupling portion 54 extending from the first coil-side yoke portion 52 accommodated in the first coil 41 to the second coil-side yoke portion 53 accommodated in the second coil 42 couples the two coil-side yoke portions 52 and 53. The fixed yoke 51 extending from the accommodation space 41a of the first coil 41 to the accommodation space 42a of the second coil 42 is formed as described above.

The movable yokes 71 and 72 are, like the fixed yoke 51, formed of a magnetic material, for example, soft iron or an electromagnetic steel sheet. The movable yokes 71 and 72 are substantially identically shaped each being formed of a flat rectangular plate. The movable yokes 71 and 72 are positioned to oppose each other across the two coils 41 and 42 sandwiched in the z-axis direction by the movable yokes 71 and 72 and are held by the knob base 74. The movable yokes 71 and 72 include first holding surfaces 71a and 72a, respectively, and second holding surfaces 71b and 72b, respectively. The movable yoke 71 holds the mounting surface 69 of the magnet 61 by the first holding surface 71a and the mounting surface 69 of the magnet 63 by the second holding surface 71b. The other movable yoke 72 holds the mounting surface 69 of the magnet 62 by the first holding surface 72a and the mounting surface 69 of the magnet 64 by the second holding surface 72b.

Figure 8:
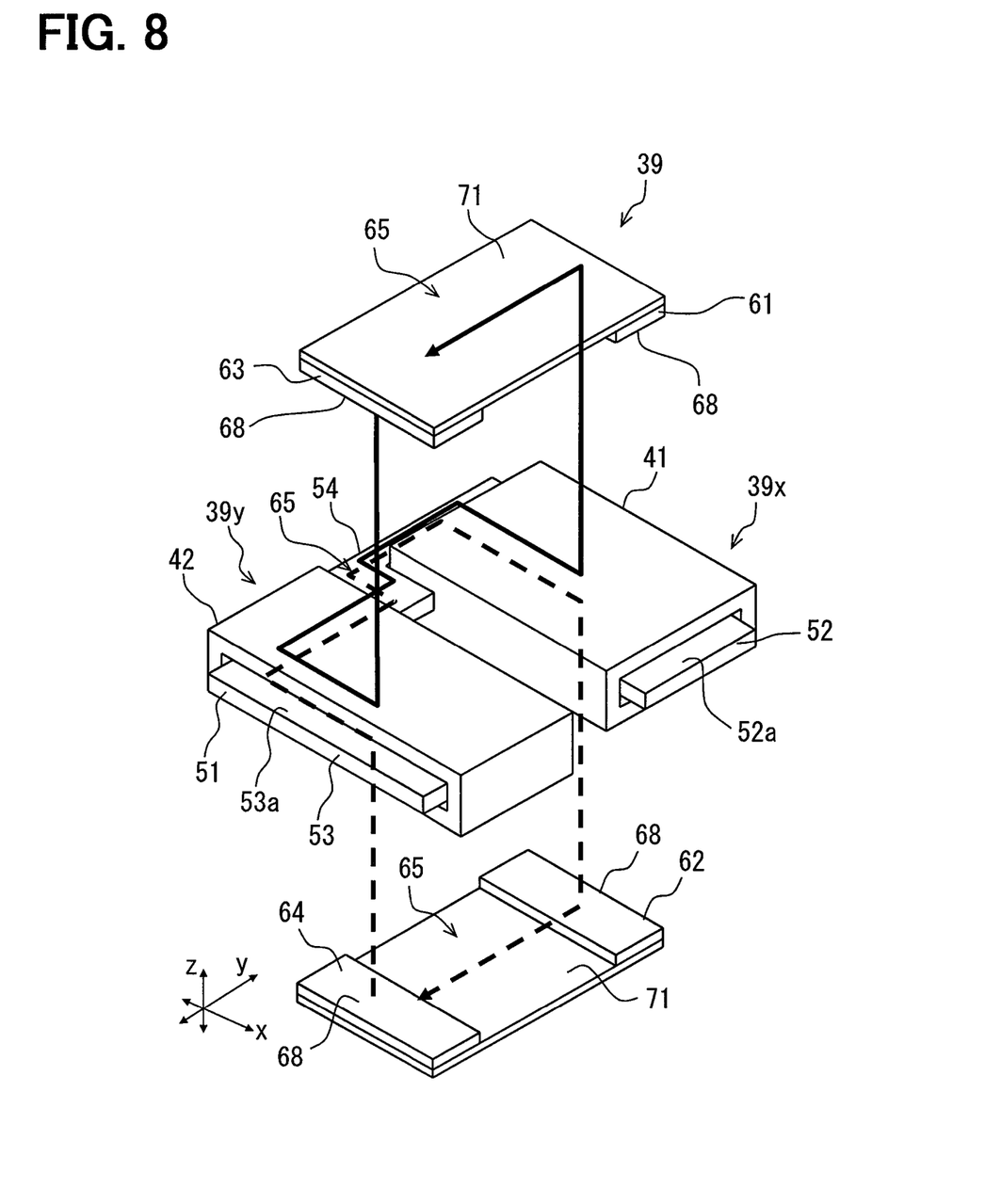
FIG. 8 is an exploded perspective view of the reaction force generator schematically showing magnetic flux flows through the magnetic circuit.

The fixed yoke 51, the two movable yokes 71 and 72 and other parts described above make up, as a magnetic path forming body 66, a magnetic circuit 65 of the reaction force generator 39 shown in FIGS. 6 to 8. The magnetic circuit 65 formed through the fixed yoke 51 and movable yokes 71 and 72 leads the magnetic fluxes generated by the magnets 61 and 62 of the first VCM 39x to the second VCM 39y while also leading the magnetic fluxes generated by the magnets 63 and 64 of the second VCM 39y to the first VCM 39x.

To be more specific, in the magnets 61 and 62 of the first VCM 39x shown in FIGS. 6 and 8, the magnetized surfaces 68 both facing the first coil 41 have a same magnetic pole. Therefore, the magnetic fluxes generated by the magnets 61 and 62 are mutually oppositely directed along the z-axis. Hence, magnetic fluxes to travel from the respective first opposing surfaces 52a toward the first holding surfaces 71a and 72a are generated. These magnetic fluxes enter the movable yokes 71 and 72 via the first holding surfaces 71a and 72a, then, in the movable yokes 71 and 72, further travel toward the second holding surfaces 71b and 72b, respectively.

Furthermore, in the magnets 63 and 64 of the second VCM 39y shown in FIGS. 7 and 8, the magnetized surfaces 68 both facing the second coil 42 have a same magnetic pole differing from the magnetic pole of the two magnetized surfaces 68 facing the first coil 41 (see FIG. 6 also). Therefore, the magnetic fluxes generated by the magnets 63 and 64 are mutually oppositely directed along the z axis.

Hence, magnetic fluxes to travel from the second holding surfaces 71b and 72b toward the second opposing surfaces 53a are generated. Thus, the magnetic fluxes induced by the movable yokes 71 and 72 travel from the second opposing surfaces 53a into the second coil-side yoke portion 53 and further head for the first coil-side yoke portion 52 via the coupling portion 54. The magnetic fluxes induced through the fixed yoke 51 then travel from the first opposing surfaces 52a toward the first holding surfaces 71a and 72a (see FIG. 7).

As described above, in the reaction force generator 39 shown in FIGS. 6 to 8, the magnetic fluxes generated by the magnets 61 and 62 of the first VCM 39x pass through not only the first coil 41 of the VCM 39x but also the second coil 42 of the second VCM 39y by being led through the magnetic circuit 65. Similarly, the magnetic fluxes generated by the magnets 63 and 64 of the second VCM 39y pass through not only the second coil 42 but also the first coil 41 of the first VCM 39x by being led through the magnetic circuit 65. Therefore, the magnetic flux density between the first opposing surfaces 52a and the first holding surfaces 71a and 72a and the magnetic flux density between the second opposing surfaces 53a and the second holding surfaces 71b and 72b are both higher than in cases where the VCM 39x and VCM 39y include respectively different magnetic circuits. Thus, with the density of the magnetic flux passing through the winding 49 of the first coil 41 in the z-axis direction increased, the electromagnetic force EMF_x that can be generated in the first VCM 39x is increased. Similarly, with the density of the magnetic flux passing through the winding 49 of the second coil 42 in the z-axis direction increased, the electromagnetic force EMF_x that can be generated in the second VCM 39y is increased. In this way, it is possible, while keeping the amount of material required to form the magnets 61 to 64 small, to increase the operation reaction forces RF_x and RF_y applicable to the knob 73 in the movable portion 70 and also to the operator.

Furthermore, in the first VCM 39x of the first embodiment, the first opposing surfaces 52a are positioned to face the two magnets 61 and 62 in the z-axis direction across the winding 49 of the first coil 41 that is sandwiched between the two magnets 61 and 62 on the outer side of the winding 49 and the first opposing surfaces 52a on the inner side. Therefore, the magnetic force of the magnet 61 to attract the first opposing surface 52a facing the magnet 61 can cancel the magnetic force of the magnet 62 to attract the first opposing surface 52a facing the magnet 62. Similarly, in the second VCM 39y, the magnetic force of the magnet 63 to attract the second opposing surface 53a facing the magnet 63 can cancel the magnetic force of the magnet 64 to attract the second opposing surface 53a facing the magnet 64. When, in this way, the magnetic attraction force acting on the movable portion 70 is reduced, the movable portion 70 can be smoothly moved by the operating force applied by the operator.

Also, the arrangement of the magnetic poles of the magnets 61 to 64 of the first embodiment causes the magnetic fluxes generated by the magnets 61 to 64 to be identically directed to travel through the magnetic circuit 65. Hence, the magnetic fluxes generated by the magnets 61 to 64 are prevented from mutually canceling in the magnetic circuit 65. This further increases the density of the magnetic fluxes to pass through the coils 41 and 42 in the z-axis direction. Hence, it is possible to further increase the electromagnetic forces EMF_x and EMF_y that can be generated by the VCM 39x and VCM 39y.

Furthermore, in the first embodiment, the movable yokes 71 and 72 directly hold the magnets 61 to 64 by the holding surfaces 71a, 72a, 71b, and 72b. Therefore, the magnetic fluxes generated by the magnets 61 to 64 can enter, virtually with no loss, the movable yokes 71 and 72 to then travel through the magnetic circuit 65. In this way, the density of the magnetic fluxes passing through the coils 41 and 42 in the z-axis direction can be further increased, and the electromagnetic forces EMF_x and EMF_y can be further increased.

Still furthermore, in the first embodiment, the magnets 61 and 62 of the VCM 39x and the magnets 63 and 64 of the VCM 39y are respectively arranged in the z-axis direction. Therefore, the magnetic attraction forces between the magnets 61 to 64 and the fixed yoke 51 act in the z-axis direction. Virtually, the magnetic attraction forces do not act in either the x-axis direction or the y-axis direction extending along the operation plane OP. This makes it possible to more smoothly move the movable portion 70 in a direction along the operation plane OP without being obstructed by the magnetic attraction forces. This effect is rendered particularly effective in the above configuration in which the magnetic flux density and, hence, the magnetic attraction forces have been increased with the VCM 39x and VCM 39y sharing the continuous magnetic circuit 65.

Now, assume that the position of the movable portion 70 relative to the fixed portion 50 is shifted in the z-axis direction increasing the distance between the magnets 61 and 63 and the upperside coil surfaces 41u and 42u. In this case, the Lorentz force generated on each of the upperside coil surfaces 41u and 42u decreases. The above shifting of the movable portion 70 in the z-axis direction, however, reduces the distance between the magnets 62 and 64 and the underside coil surfaces 41d and 42d. Therefore, the Lorentz force generated on each of the underside coil surfaces 41d and 42d can increase so as to make up for the decrease in the Lorentz force generated on each of the upperside coil surfaces 41u and 42u. Thus, in the configuration of the first embodiment, even if the position of the movable portion 70 relative to the fixed portion 50 is unavoidably shifted, for example, due to variations in component shapes and component-mounted states, the electromagnetic forces EMF_x and EMF_y that can be generated in the VCM 39x and VCM 39y can be maintained.

Furthermore, in the first embodiment, the magnetic attraction forces generated in the VCM 39x and VCM 39y are balanced in the z-axis direction. Therefore, the magnetic attracting forces are prevented from generating a rotational moment to tilt the operation knob 73 relative to the operation plane OP.

Still furthermore, in the first embodiment, the magnetic circuit 65 is formed by combining the fixed yoke 51 that extends between the accommodation space 41a and 42a of the coils 41 and 42 and the movable yokes 71 and 72 sandwiching the coils 41 and 42 in the z-axis direction. In this configuration, the magnetic fluxes generated by the magnets 61 to 64 can be made to efficiently travel in the VCM 39x and VCM 39y. This makes it possible to further increase the density of the magnetic fluxes passing through the coils 41 and 42 so as to allow the VCM 39x and VCM 39y to generate still greater electromagnetic forces EMF_x and EMF_y.

Also, in the first embodiment, out of the coils 41 and 42 and the magnets 61 to 64, the magnets 61 to 64 are movable, whereas the coils 41 and 42 to be electrically coupled to the reaction force controller 37 are included in the fixed portion. In this way, wiring can be formed without giving any consideration to movement of the coils 41 and 42, so that the configuration of the operation input device 100 can be simplified.

In the first embodiment, the operation input device 100 corresponds to the "input device," the first VCM 39x corresponds to the "first actuator," and the second VCM 39y corresponds to the "second actuator." Also, the accommodation space 41a and 42a each correspond to the "inner peripheral space," the fixed portion 50 corresponds to the "supporting unit," and the movable portion 70 corresponds to the "input unit." Furthermore, the magnets 61 and 62 correspond to the "first magnetic pole forming unit" and the magnets 63 and 64 correspond to the "second magnetic pole forming unit." Still furthermore, the fixed yoke 51 corresponds to the "inner magnetic yoke" and the movable yokes 71 and 72 each correspond to the "outer magnetic yoke."

Second Embodiment

FIGS. 9 to 13 represent a second embodiment of the present disclosure which is a modification of the first embodiment. A reaction force generator 239 of an operation input device 200 of the second embodiment includes a first VCM 239x, a second VCM 239y, and a magnetic path forming body 266 which includes a movable yoke 251 and two fixed yokes 271 and 272. The first VCM 239x includes a first coil 241 and two magnets 261 and 262. The second VCM 239y includes a second coil 242 and two magnets 263 and 264.

Figure 9:
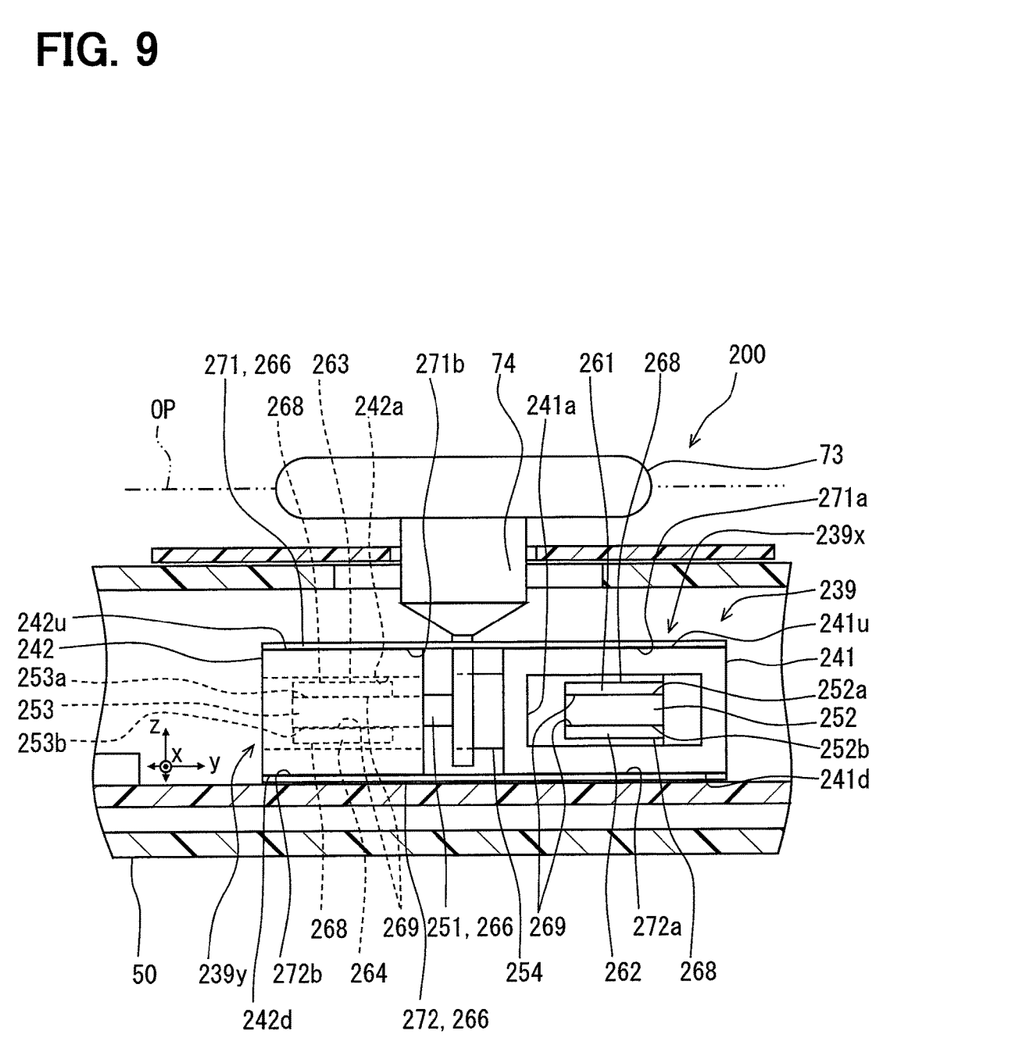
FIG. 9 is a sectional view of an operation input device according to a second embodiment of the present disclosure.
Figure 10:
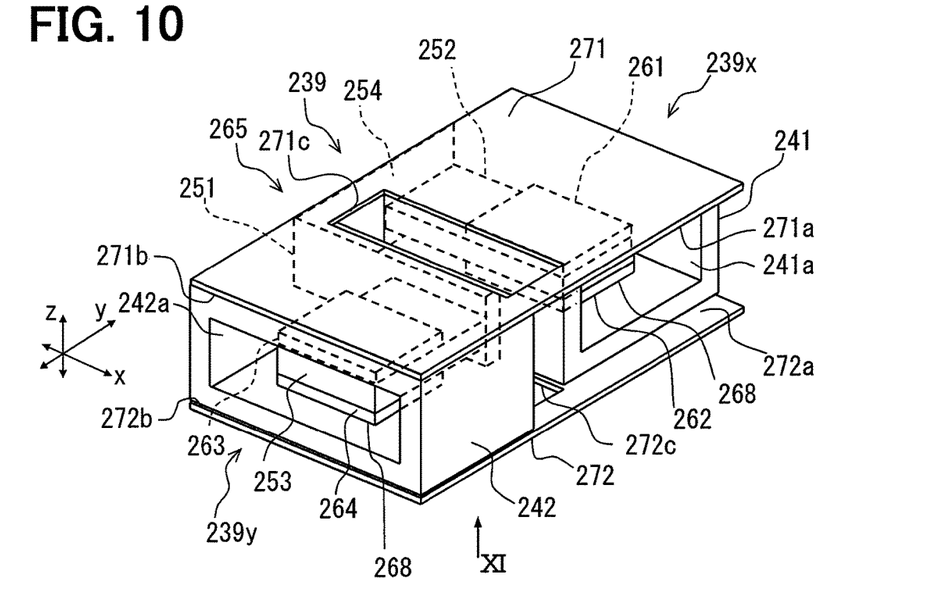
FIG. 10 is a perspective view of a reaction force generator according to the second embodiment.
Figure 11:
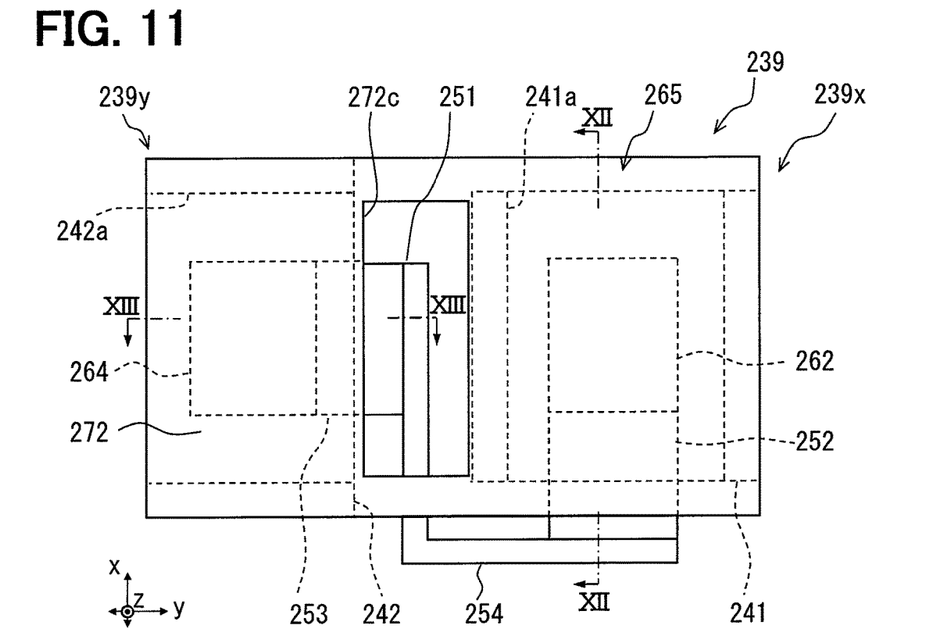
FIG. 11 is a bottom view of the reaction force generator as seen in the direction of arrow XI in FIG. 10.

The coils 241 and 242 shown in FIGS. 9 to 11 have configurations corresponding to the configurations of the coils 41 and 42 (see FIG. 3) of the first embodiment. The coils 241 and 242 form, similarly to the coils 41 and 42 of the first embodiment, accommodation space 241a and 242a, upperside coil surfaces 241u and 242u, and underside coil surfaces 241d and 242d. The accommodation space 241a and 242a accommodate the magnets 261 to 264 and the movable yoke 251. The upperside coil surfaces 241u and 242u are attached to the fixed yoke 271. The underside coil surfaces 241d and 242d are attached to the fixed yoke 272.

The four magnets 261 to 264 are mounted similarly to the magnets 61 to 64 of the first embodiment (see FIG. 3) and form mounting surfaces 269 and magnetized surfaces 268. The mounting surfaces 269 are attached to the movable yoke 251 such that their longer sides extend along the y axis. The magnets 261 and 262 are accommodated in the accommodation space 241a of the first coil 241 such that the magnets 261 and 262 sandwich the movable yoke 251 from both sides in the z-axis direction. The magnets 263 and 264 are accommodated in the accommodation space 242a of the second coil 242 such that the magnets 263 and 264 sandwich the movable yoke 251 from both sides in the z-axis direction.

The movable yoke 251 is, in a state separated from the coils 241 and 242 and the fixed yokes 271 and 272, hung from the knob base 74. The movable yoke 251 includes two magnet-side yoke portions 252 and 253 shaped into a flat plate shape and a coupling portion 254 coupling the magnet-side yoke portions 252 and 253.

A magnet-side yoke portion (hereinafter referred to as the "first magnet-side yoke portion") 252 is accommodated in the accommodation space 241a of the first coil 241. The first magnet-side yoke portion 252 accommodated in the accommodation space 241a has first holding surfaces 252a and 252b forming upperside and underside surfaces of the first magnet-side yoke portion 252. The first magnet-side yoke portion 252 holds the mounting surface 269 of the magnet 261 by the first holding surface 252*a* and holds the mounting surface 269 of the magnet 262 by the first holding surface 252*b*.

The other magnet-side yoke portion (hereinafter referred to as the "second magnet-side yoke portion") 253 is accommodated in the accommodation space 242*a* of the second coil 242. The second magnet-side yoke portion 253 accommodated in the accommodation space 242*a* has second holding surfaces 253*a* and 253*b* forming upperside and underside surfaces of the second magnet-side yoke portion 253. The second magnet-side yoke portion 253 holds the mounting surface 269 of the magnet 263 by the second holding surface 253*a* and holds the mounting surface 269 of the magnet 264 by the second holding surface 253*b*.

The coupling portion 254 is bent in an L-shape along the coils 241 and 242. There is a gap between the coupling portion 254 and each of the coils 241 and 242. The gap corresponds to the maximum stroke of the operation knob 73. The movable yoke 251 extending from the accommodation space 241*a* of the first coil 241 to the accommodation space 242*a* of the second coil 242 is formed by having the two magnet-side yoke portions 252 and 253 coupled by the coupling portion 254.

The fixed yokes 271 and 272 are each formed of a flat rectangular plate and are substantially identically shaped. The fixed yokes 271 and 272 are positioned to oppose each other while sandwiching the two coils 241 and 242 from both sides in the z-axis direction and are fixed to the fixed portion 50. The fixed yokes 271 and 272 respectively include first opposing surfaces 271*a* and 272*a*, second opposing surfaces 271*b* and 272*b*, and openings 271*c* and 272*c*. The two first opposing surfaces 271*a* and 272*a* are positioned to face the magnetized surfaces 268 of the magnets 261 and 262, respectively, such that the first coil 241 is sandwiched from inside and outside by the two first opposing surfaces 271*a* and 272*a* and the magnets 261 and 262 accommodated in the accommodation space 241*a*. Similarly, the two second opposing surfaces 271*b* and 272*b* are positioned to face the magnetized surfaces 268 of the magnets 263 and 264, respectively, such that the second coil 242 is sandwiched from inside and outside by the two second opposing surfaces 271*b* and 272*b* and the magnets 263 and 264 accommodated in the accommodation space 242*a*. The rectangle openings 271*c* and 272*c* having longer sides in the y-axis direction are formed to penetrate through the fixed yokes 271 and 272, respectively, in the direction of the thicknesses of the fixed yokes 271 and 272. The opening 271*c* allows the portion (not shown) holding the movable yoke 251 of the knob base 74 to pass through the opening 271*c*.

Figure 12:
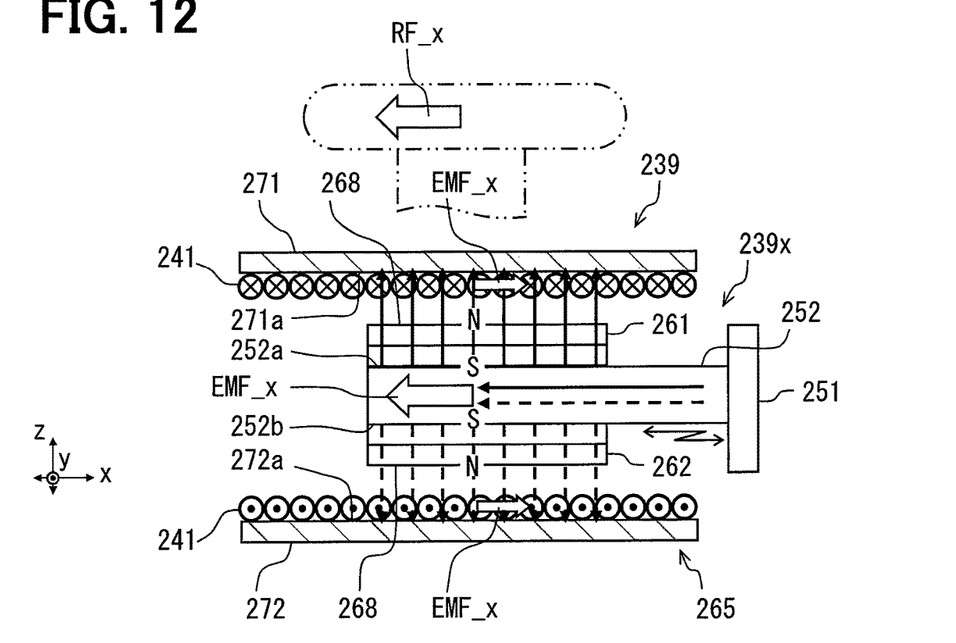
FIG. 12 is a view taken along line XII-XII in FIG. 11 schematically showing magnetic flux flows through a magnetic circuit.
Figure 13:
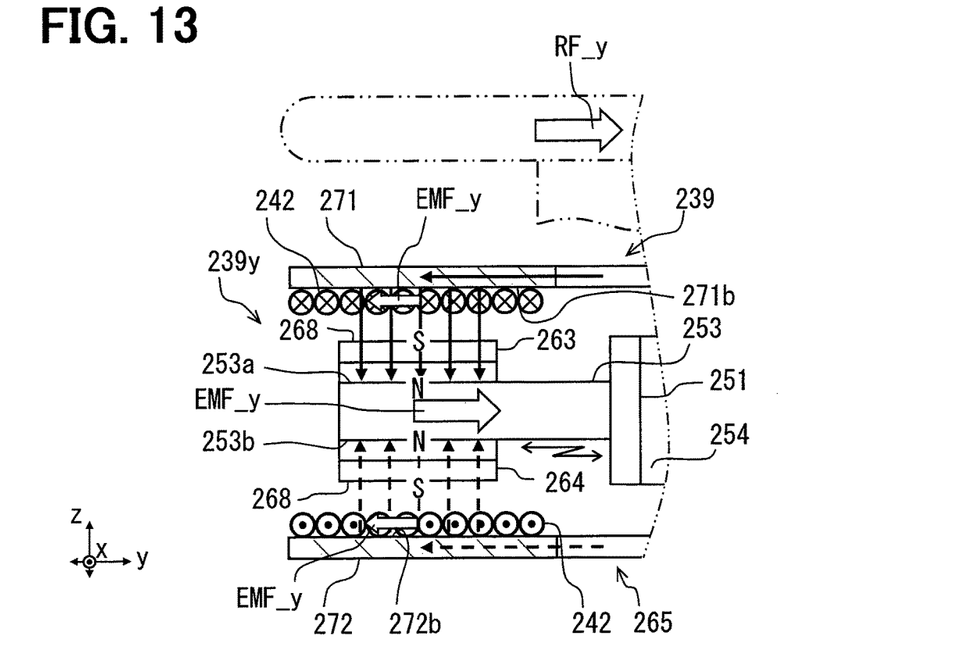
FIG. 13 is a view taken along line XIII-XIII in FIG. 11 schematically showing magnetic flux flows through the magnetic circuit.

The movable yoke 251 and two fixed yokes 271 and 272 etc. make up a magnetic circuit 265 of the reaction force generator 239 shown in FIGS. 12 and 13. As shown in FIG. 12, in the first VCM 239*x*, the magnetic fluxes generated by the two magnets 261 and 262 having the magnetized surfaces 268 of a same magnetic pole are mutually oppositely directed. Hence, the magnetic fluxes generated by the two magnets 261 and 262 travel from the first holding surfaces 252*a* and 252*b* toward the first opposing surfaces 271*a* and 272*a*, passing through the first coil 241 in the z-axis direction. The magnetic fluxes then enter the fixed yokes 271 and 272 through the first opposing surfaces 271*a* and 272*a* and further travel from the first opposing surfaces 271*a* and 272*a* toward the second opposing surfaces 271*b* and 272*b* shown in FIG. 13.

In the second VCM 239*y*, the magnetic fluxes generated by the two magnets 263 and 264 having the magnetized surfaces 268 of a same magnetic pole are mutually oppositely directed. Hence, the magnetic fluxes generated by the two magnets 263 and 264 travel from the second opposing surfaces 271*b* and 272*b* toward the second holding surfaces 253*a* and 253*b*, passing through the second coil 242 in the z-axis direction. Thus, the magnetic fluxes induced by the fixed yokes 271 and 272 enter the second magnet-side yoke portion 253 via the second holding surfaces 253*a* and 253*b*, then further travel toward the magnet-side yoke portion 252 shown in FIG. 12, passing through the coupling portion 254.

As described above, in the reaction force generator 239 shown in FIGS. 12 and 13, the magnetic fluxes generated by the magnets 261 and 262 pass through not only the first coil 241 of the first VCM 239*x* but also the second coil 242 of the second VCM 239*y* by being led through the magnetic circuit 265. Similarly, the magnetic fluxes generated by the magnets 263 and 264 pass through not only the second coil 242 but also the first coil 241 of the first VCM 239*x* by being led through the magnetic circuit 265. Hence, the magnetic flux density between the first opposing surfaces 271*a* and 272*a* and the first holding surfaces 252*a* and 252*b* and also the magnetic flux density between the second opposing surfaces 271*b* and 272*b* and the second holding surfaces 253*a* and 253*b* both become higher than in cases where different VCMs have different magnetic circuits. In this way, the density of the magnetic fluxes passing through the coils 241 and 242 in the z-axis direction increases, so that the electromagnetic forces EMF_x and EMF_y that can be generated in the first VCM 239*x* and second VCM 239*y* both increase. Hence, in the second embodiment, too, it is possible, while keeping the amount of material required to form the magnets 261 to 264 small, to increase the operation reaction forces RF_x and RF_y.

In the second embodiment, the operation input device 200 corresponds to the "input device," the first VCM 239*x* corresponds to the "first actuator," and the second VCM 239*y* corresponds to the "second actuator." Also, the accommodation space 241*a* and 242*a* each correspond to the "inner peripheral space," the magnets 261 and 262 correspond to the "first magnetic pole forming unit" and the magnets 263 and 264 correspond to the "second magnetic pole forming unit." Furthermore, the movable yoke 251 corresponds to the "inner magnetic yoke" and the fixed yokes 271 and 272 each correspond to the "outer magnetic yoke."

Third Embodiment

Figure 14:
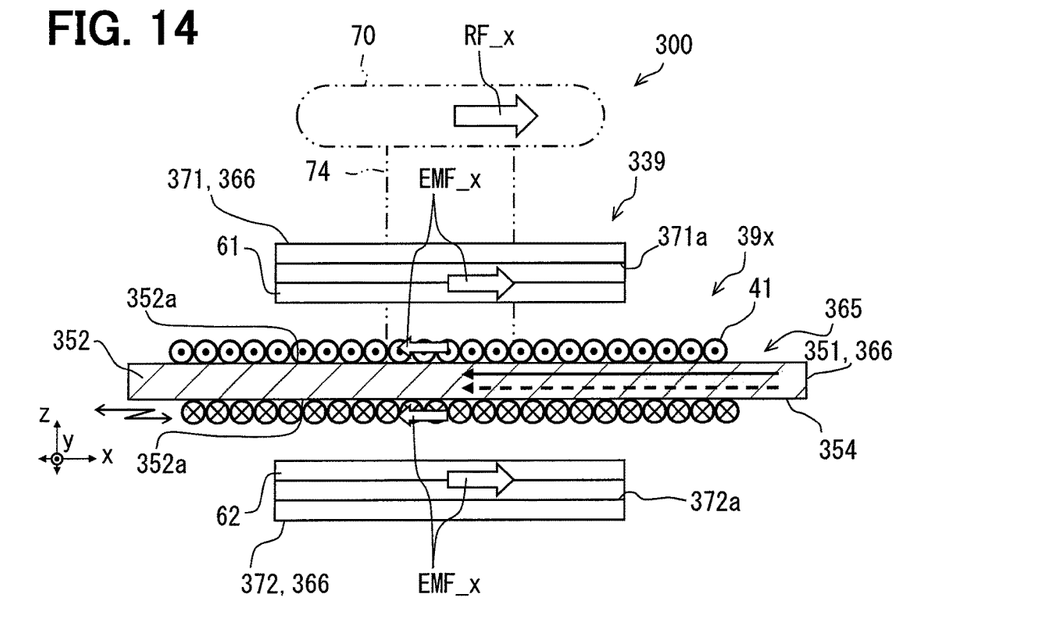
FIG. 14 schematically shows magnetic flux flows through a magnetic circuit of a reaction force generator according to a third embodiment.
Figure 15:
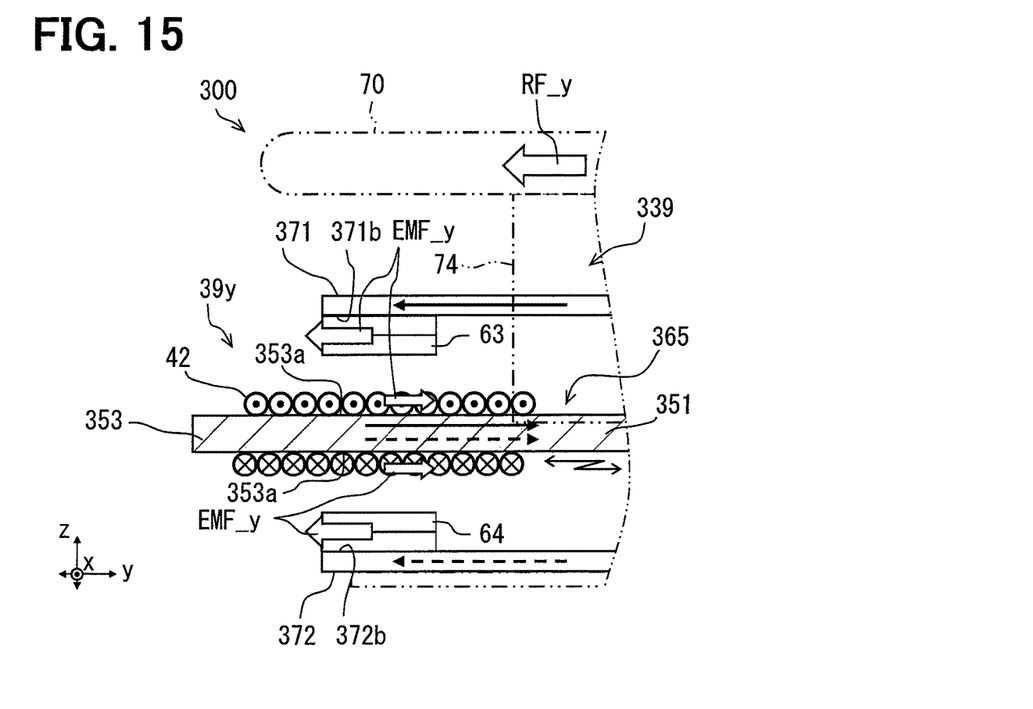
FIG. 15 schematically shows magnetic flux flows through the magnetic circuit of the reaction force generator according to the third embodiment.

FIGS. 14 and 15 represent a third embodiment of the present disclosure which is another modification of the first embodiment. In a reaction force generator 339 of an operation input device 300 of the third embodiment, a first coil 41 and a second coil 42 are movable together with a movable portion 70. The reaction force generator 339 includes a first VCM 39*x*, a second VCM 39*y*, a movable yoke 351, and a magnetic path forming body 366 which includes a movable yoke 351 and two fixed yokes 371 and 372.

The movable yoke 351 is, in a state separated from the coils 41 and 42 and the fixed yokes 371 and 372, hung from the knob base 74 similarly to the movable yoke 251 of the second embodiment (see FIG. 9). The movable yoke 351 includes a first coil-side yoke portion 352, a second coil-side yoke portion 353, and a coupling portion 354. The coil-side yoke portions 352 and 353 and the coupling portion 354 are substantially identical to the coil-side yoke portions 52 and 53 and the coupling portion 54 (see FIG. 3) of the first embodiment. The first coil-side yoke portion 352 has two first opposing surfaces 352*a* forming upperside and underside surfaces of the first coil-side yoke portion 352. The second coil-side yoke portion 353 has two second opposing surfaces 353a forming upperside and underside surfaces of the second coil-side yoke portion 353.

The fixed yokes 371 and 372 are, like the fixed yokes 271 and 272 (see FIG. 9) of the second embodiment, fixed to the fixed portion 50 (see FIG. 9). The fixed yokes 371 and 372 respectively have first holding surfaces 371a and 372a and second holding surfaces 371b and 372b. The fixed yoke 371 holds the magnets 61 and 63 by the holding surfaces 371a and 371b. The fixed yoke 372 holds the magnets 62 and 64 by the holding surfaces 372a and 372b.

In the third embodiment described above, too, like in the first embodiment, a magnetic circuit 365 is routed through the two VCMs 39x and 39y. This increases the density of the magnetic fluxes passing through the coils 41 and 42 in the z-axis direction. Hence, the electromagnetic forces EMF_x and EMF_y that can be generated in the first VCM 39x and second VCM 39y both increase. It is, therefore, possible, while keeping the amount of material required to form the magnets 61 to 64 small, to increase the operation reaction forces RF_x and RF_y.

In the third embodiment, the operation input device 300 corresponds to the "input device," the movable yoke 351 corresponds to the "inner magnetic yoke," and the fixed yokes 371 and 372 each correspond to the "outer magnetic yoke."

Other Embodiments

Embodiments of the present disclosure have been described, but the disclosure should not be construed as being limited to the embodiments. The disclosure can be applied to various embodiments and embodiment combinations without departing from the gist of the disclosure.

In a first modification of the foregoing second embodiment, like in the second embodiment, the two magnets are accommodated in the accommodation space of each of the two coils. The magnets totaling four are held by a fixed yoke extending from one of the two accommodation space to the other and are fixed to a fixed body. The two coils are held by and between, in the z-axis direction, the two movable yokes that are held in a state of being hung from the knob base. The two coils are movable together with the movable portion. In this first modification, too, with the magnets disposed in the coils, the coils can be moved together with the movable portion like in the third embodiment.

In the foregoing embodiments, each actuator has a configuration in which each coil is combined with two magnets, the number of magnets disposed to oppose each coil in an actuator may also be one or three or more. Furthermore, in the foregoing embodiments, each magnet serves as a "magnetic pole forming unit," but a plurality of magnets may be combined to configure a magnetic pole forming unit.

In the foregoing embodiments, each magnet has a rectangular plate shape and has a mounting surface which faces a magnetized surface which faces a coil. However, the shape of each magnet and the magnet holding structure in which each magnet is held by a fixed or movable yoke may be appropriately changed. The magnet material may also be changed appropriately.

Furthermore, fixed yokes and movable yokes serving as "magnetic path forming bodies" may be magnetized and may integrally form a "magnetic pole forming unit."

In the foregoing embodiments, each coil is positioned such that the coil winding axis extends along the operation plane. Alternatively, the positioning of each coil may be changed appropriately. For example, each coil may be positioned such that the winding axis thereof extends along the z axis or inclinedly to the operation plane.

In the foregoing embodiments, a reaction force generator includes two independently configured actuators such that the magnets included in one of the two actuators are not opposed to the coil included in the other actuator. A reaction force generator can include three or more such actuators. In a reaction force generator including four actuators, for example, four coils may be arranged crosswise. In such a configuration, too, by coupling the magnetic circuits of the actuators, the electromagnetic forces that can be generated in the respective actuators can be further increased.

The direction of the electromagnetic force generated by the first actuator represented as the "first direction" need not be the x-axis direction. The direction of the electromagnetic force generated by the second actuator represented as the "second direction" need not be the y-axis direction. The "first direction" and the "second direction" may be inclined relative to the x-axis and the y-axis as long as the two directions are nonparallel to each other.

In drawings, for example, FIGS. 6 and 7 referred to in description of the foregoing embodiments, each coil is shown as having a one-layer winding, but the number of windings of each coil may be appropriately changed depending on the required magnitude of the electromagnetic force to be generated. The winding of each coil may be wound around, for example, a cylindrical bobbin.

In the first embodiment, the "inner magnetic yoke" extending from the accommodation space of one of the coils to the accommodation space of the other coil is formed of a single member. However, the "inner magnetic yoke" may be formed by assembling a plurality of members. Similarly, the shape and configuration of the "outer magnetic yoke" may be appropriately changed.

A display system representing a modification of the foregoing embodiments includes a head-up display device 120 shown in FIG. 2 instead of or along with the navigation device 20. The head-up display system 120 is installed in the instrument panel of the vehicle in front of the driver seat. The head-up display system 120 projects, for virtual image display, an image to a predetermined projection area 122 on the windshield. The operator seated at the driver seat can see, in the projection area 122, a pointer 80 to arbitrarily select one or more icons associated with respective functions. The pointer 80 can be moved in the projection area 122, like when the pointer 80 is shown on the display screen 22, by horizontally moving the operation knob 73. The direction in which the pointer 80 moves corresponds to the direction in which the operation knob 73 is moved.

In the embodiments described in the foregoing, the present disclosure is applied to an operation input device installed in a center console as a remote operation device for operating, for example, a navigation device. The present disclosure is, however, also applicable to, for example, selectors like a shift lever installed in a center console and steering switches provided on a steering wheel. The present disclosure is also applicable to instrument panels, armrests provided on doors, and various vehicle function operating devices provided in the vicinity of rear seats. An operation input device with the present disclosure applied thereto can be employed for operation systems in general not only for vehicles but also for various transportation equipment and various information terminals.

What is claimed is:
1. An input device, comprising:
an input unit for input of an operating force in a direction along an operation plane;

a supporting unit movably supporting the input unit such that the input unit is movable along the operation plane in response to the input of the operating force;
a first actuator including a first magnetic pole forming unit and a first coil, wherein the first magnetic pole forming unit forms a magnetic pole and generates a magnetic flux passing through the first coil such that an electromagnetic force generated by applying current to the first coil acts on the input unit as an operation reaction force in a first direction along the operation plane;
a second actuator including a second magnetic pole forming unit and a second coil, wherein the second magnetic pole forming unit forms a magnetic pole and generates a magnetic flux passing through the second coil such that an electromagnetic force generated by applying current to the second coil acts on the input unit as an operation reaction force in a second direction along the operation plane and the second direction is nonparallel to the first direction; and
a magnetic path forming body forming a magnetic circuit that
guides the magnetic flux generated by the first magnetic pole forming unit so that the magnetic flux generated by the first magnetic pole forming unit passes through the second coil and
also guides the magnetic flux generated by the second magnetic pole forming unit so that the magnetic flux generated by the second magnetic pole forming unit passes through the first coil.

2. The input device according to claim 1, wherein:
the first actuator includes at least two of the first magnetic pole forming units positioned apart from each other,
the second actuator includes at least two of the second magnetic pole forming units positioned apart from each other, and
the magnetic path forming body forms:
two first opposing surfaces respectively facing the first magnetic pole forming units such that the first coil is sandwiched between the first opposing surfaces on an inside of the first coil and the first magnetic pole forming units on an outside of the first coil; and
two second opposing surfaces respectively facing the second magnetic pole forming units such that the second coil is sandwiched between the second opposing surfaces on an inside of the second coil and the second magnetic pole forming units on an outside of the second coil.

3. The input device according to claim 2, wherein
the magnetic poles of the first magnetic pole forming units facing the first coil are one of an N pole or an S pole, and
the magnetic poles of the second magnetic pole forming units facing the second coil are the other of the N pole or the S pole.

4. The input device according to claim 2, wherein
the magnetic path forming body forms two first holding surfaces to hold the first magnetic pole forming units and two second holding surfaces to hold the second magnetic pole forming units.

5. The input device according to claim 2, wherein
each of the first coil and the second coil is formed of a winding and is positioned so that a winding axis of each of the first coil and the second coil extends along the operation plane and
the first magnetic pole forming units and the second magnetic pole forming units are respectively arranged along a direction substantially perpendicular to the operation plane.

6. The input device according to claim 5, wherein
the magnetic path forming body includes:
an inner magnetic yoke extending from an inner peripheral space of the first coil to an inner peripheral space of the second coil; and
a pair of outer magnetic yokes opposing each other such that the first coil and the second coil each partly accommodating the inner magnetic yoke are sandwiched between the outer magnetic yokes in a direction substantially perpendicular to the operation plane.

7. The input device according to claim 1, wherein
the first magnetic pole forming unit and the second magnetic pole forming unit are movable together with the input unit.

8. The input device according to claim 1, wherein
the first coil and the second coil are movable together with the input unit.

* * * * *